No. 631,829. Patented Aug. 29, 1899.
L. ST. PETER.
APPARATUS FOR PERFECTING COMBUSTION IN BOILER FURNACES.
(Application filed Sept. 19, 1898.)
(No Model.)
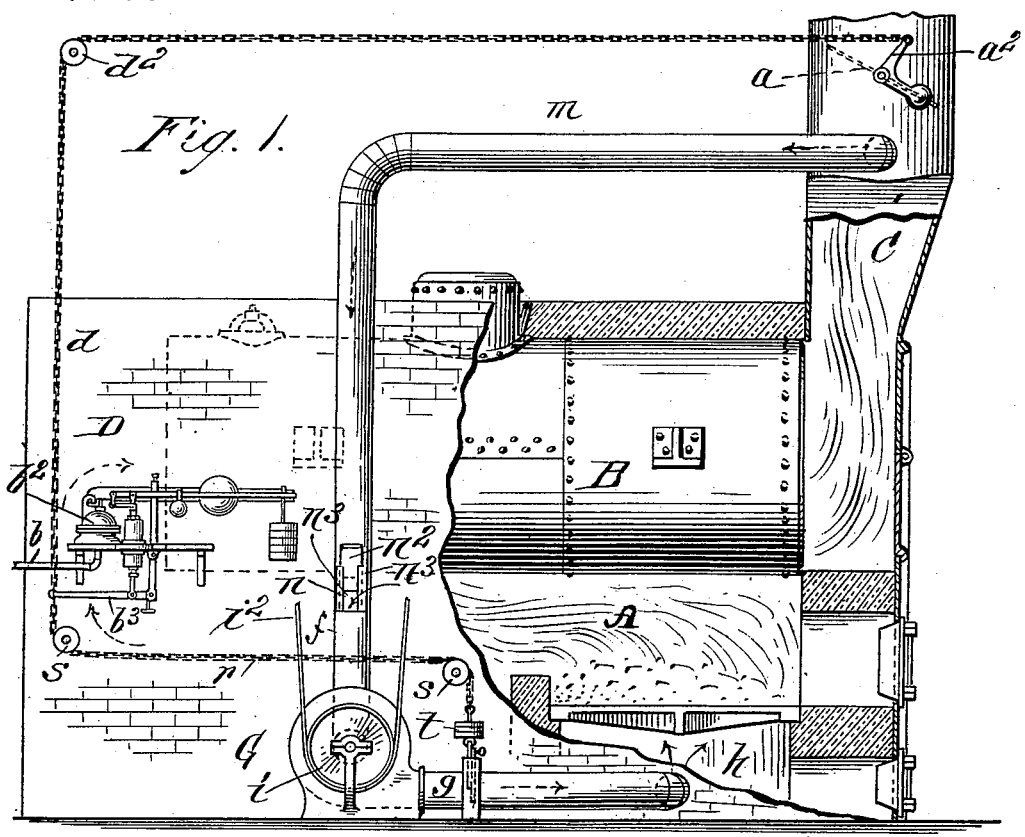
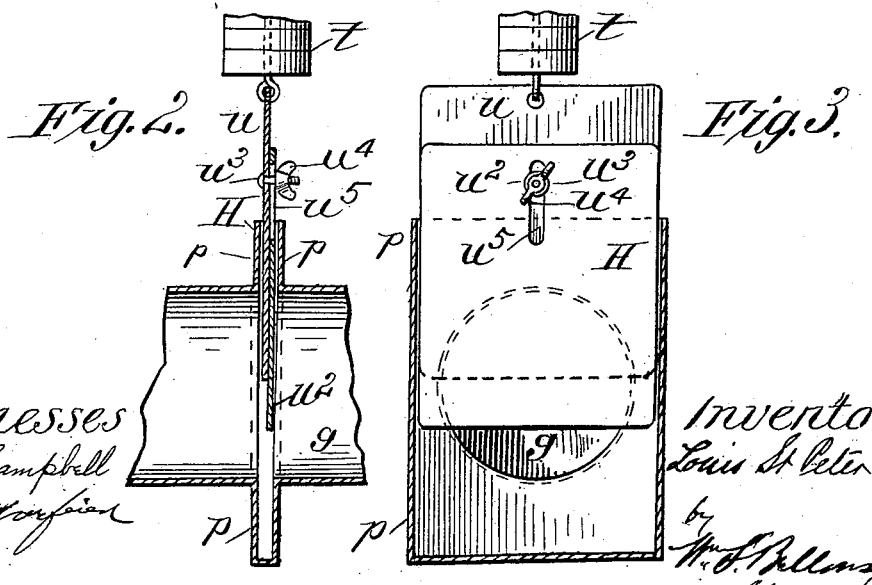
Witnesses
M. A. Campbell
Inventor,
Louis St. Peter
by
Attorney.

UNITED STATES PATENT OFFICE.

LOUIS ST. PETER, OF SPRINGFIELD, MASSACHUSETTS.

APPARATUS FOR PERFECTING COMBUSTION IN BOILER-FURNACES.

SPECIFICATION forming part of Letters Patent No. 631,829, dated August 29, 1899.

Application filed September 19, 1898. Serial No. 691,400. (No model.)

*To all whom it may concern:*

Be it known that I, LOUIS ST. PETER, a subject of the Queen of Great Britain, and a resident of Springfield, in the county of Hampden and State of Massachusetts, have invented certain new and useful Improvements in Apparatus for Perfecting Combustion in Boiler-Furnaces, of which the following is a full, clear, and exact description.

The object of the invention is to provide an apparatus for perfecting the combustion of the fuel in boiler-furnaces which is automatic and self-regulating and is, furthermore, capable of being modified to acquire conditions for supplying air to the furnace to accord with varying circumstances and situations; and the invention consists in the combination, with the blower and with the automatically-operated smoke-damper, of the smoke-stack, of a gate or valve for regulating the quantity of air delivered by the blower into the furnace, which gate or valve is automatically operated in conjunction with said smoke-damper.

The invention furthermore consists in an apparatus, as last above specified, in which the gate or valve for the blower discharge-pipe is adjustable; and the invention furthermore consists in the specific construction and combination of parts comprised in the apparatus, all substantially as will hereinafter fully appear and be set forth in the claims.

Reference is to be had to the accompanying drawings, in which my present improved apparatus is illustrated.

Figure 1 is a side elevation and partial vertical section of the invention. Fig. 2 is a sectional view, on a larger scale, of a portion of the length of the blower discharge-pipe, showing the transversely-arranged adjustable gate or valve therefor; and Fig. 3 is a view in section and elevation taken at right angles to Fig. 2.

In the drawings, A represents the furnace for a steam-boiler B, having the smoke stack or pipe C. The smoke-pipe is provided with a damper $a$, adapted to be automatically controlled through connections therewith from and by a regulator (indicated at D) operated by the steam-pressure, so that when the pressure becomes excessive the damper in the smoke-pipe will be closed.

$b$ represents a pipe, understood as having connection with the boiler, which leads to the regulator beneath the diaphragm thereof, understood as in the diaphragm-case $b^2$. The motion of the diaphragm through the usual lever and link connections imparts a swinging movement to the arm or lever $b^3$ of the regulator, and with this arm a chain or other suitable flexible connection $d$ is connected, it extending thence suitably guided, as by passing over the guide-sheave $d^2$, to the operating lever-arm $a^2$ of the smoke-damper.

No invention is comprised in any specific form of steam-operated regulator or in the mere combination of the smoke-damper with the steam-operated regulator.

G represents a blower for air, of which $f$ is a blower inlet-pipe, and $g$ the blower outlet-pipe, the latter being extended into the ash pit or chamber $h$ below the furnace-grate. The blower is mechanically driven by any available means—as, for instance, the pulley $i$ and belt $i^2$—taking the power from any suitable shaft in the boiler-room or elsewhere, or the blower may be driven by an electric motor comprised as a part thereof.

A comparatively large pipe or conductor $m$ leads from the smoke-stack or smoke-pipe C at any suitable point back of the smoke-damper (between the damper and the furnace) to connection with or as a continuation of the blower inlet or supply passage $f$, as shown.

The blower inlet-passage has the opening $n$ leading thereinto from the outer air, there being provided therefor the sliding door or cover $n^2$, movable in the slides $n^3$, provided on the outer side of the pipe $f$.

The blower outlet or discharge pipe $g$ has provided as a part of the walls thereof the transversely-arranged rectangular gate-guide $p$, in which the gate or blower-damper H is movable, whereby to fully close or leave more or less open, according to its position, the blower discharge-passage. This gate is automatically operated in conjunction with the smoke-pipe damper by having a support on the chain or flexible connection $r$, which is also connected to the damper-operated arm $b^3$ of the regulator, said flexible connection passing to its supporting engagement with the gate around the guide-sheaves $s\,s$, and said gate being vertically movable has normally a tendency to close by the weight $t$.

As indicated in the drawings and more particularly shown in Figs. 2 and 3, the gate or blower discharge-damper is formed in two sections or plates $u$ and $u^2$, the one vertically adjustable on the other and having, for the purposes of confining them in their adjusted relations, the screw-stud $u^3$ on the one plate and the thumb-nut $u^4$ on the other, the one plate being constructed with a slot $u^5$, whereby it may have its vertical sliding movement when the thumb-nut is loosened without impediment by the shank of the said screw-stud.

In the operation of this apparatus the blower G provides a forced draft of air, either pure air or air having combined therewith the products of combustion, as varying conditions render advantageous, into the ash-pit of the furnace. When the steam is low or at the time of starting up, there being little or no pressure on the diaphragm of the regulator, the smoke-damper will be open, and, corresponding to the open position of the smoke-damper, the blower discharge-gate will also be automatically opened, and there will be for a time the freest possible and largest volume of air entered into the ash-pit; but so soon as the steam reaches a suitably high pressure the regulator will automatically move the smoke-damper toward its closed position, in conjunction with which the gate of the blower discharge-pipe also moves toward its closed position. By closing the sliding cover $n^2$ air from the outside may be excluded from entrance to and through the furnace, and the only air which is then introduced by the blower into the ash-pit will be that having combined therewith smoke and gases which have passed from the furnace up the smoke-stack and which instead of passing away through the stack is diverted through the blower to be further consumed in the furnace; and I may under certain circumstances find it desirable to introduce air through the blower even when the smoke-damper is in its closed position, and this may be conveniently done by temporarily adjusting and shortening the gate H of the blower discharge-passage. This adjustment of the gate H may be effected in any convenient manner.

Actual use of this apparatus has proved it to be highly efficient in the burning of soft coal and other low-grade fuel, and it has been found that the smoke has been effectively consumed, and it has, furthermore, been found that the running of the furnace for the maintenance of the steam up to any given pressure has been accomplished with greater economy of fuel than has heretofore been possible in running the furnace before the hereinabove-described apparatus was combined therewith.

Having thus described my invention, what I claim, and desire to secure by Letters Patent, is—

1. The combination with a furnace, having the smoke-stack and smoke-damper therein, of a gate or valve movably applied in the discharge-passage of a blower which is located adjacent to the furnace, and which discharge-pipe enters the ash pit or chamber under the furnace-gate, and a connection between the smoke-damper and the said gate, whereby, as the damper is opened or closed, the said blower-gate will be simultaneously moved in its opening or closing position, and means for varying the relative opening or closing movement of said gate and damper.

2. The combination with a furnace, having the smoke-stack and a smoke-damper therein, and a steam-operated automatic regulator having an operative connection with the smoke-damper, of a blower having the discharge-pipe thereof leading into the ash-pit of the furnace and provided with the gate or valve adapted to open or close said blower discharge-pipe, and connections whereby said gate may be adjusted in conjunction with and relative to the steam-operated regulator and smoke-damper, substantially as described.

3. The combination with a furnace, having the smoke-stack and smoke-damper therein, and a steam-operated automatic regulator having an operative connection with the smoke-damper, of a blower having the discharge-pipe thereof leading into the ash-pit of the furnace, and provided with a gate or valve adapted to open, or close, said blower discharge-pipe, a pipe leading from the smoke-stack at a point back of the smoke-damper to and constituting the air-supply passage of the blower, and connections between the smoke-damper and said gate, said gate and damper being adjustable in relation to each other, substantially as and for the purposes set forth.

4. The combination with a furnace, having a smoke-passage, and a smoke-damper therein, and automatic means for opening and closing the damper, of a blower having the discharge-pipe thereof entered into the furnace and provided with a gate or valve adapted to open and close said passage, and formed in adjustable sections whereby it may be elongated or shortened to more or less nearly close said discharge-passage, and connection between the said smoke-damper and said gate, substantially as described.

5. The combination with a furnace, having a smoke-passage and a smoke-damper therein, and an automatic steam-operated regulator operatively connected with the smoke-damper, of a blower having the discharge-pipe thereof entered into the furnace and having the adjustable movable gate H, the pipe $m$ leading from the smoke-passage at a point back of the damper, to and constituting the air-supplying passage of the blower, provided with the opening $n$ and the adjustable door or cover $n^2$ therefor and a flexible connection operating the said blower-gate in conjunction with the operation of the smoke-damper, substantially as described.

6. The combination with a furnace, having the smoke-stack C and the smoke-damper $a$ provided with the lever-arm $a^2$, the automatic steam-operated regulator having a movable member $b^3$, a sheave-guided flexible connection $d$ between said member $b^3$ and said arm $a^2$ of the smoke-damper, of the blower G having the discharge-pipe $g$ leading into the ash-pit of the furnace and provided with the gateway $p$ and transversely-arranged gate H consisting of the two sections $u$ and $u^2$, the one being adjustable lengthwise relative to the other, and means for confining said sections, and the pipe $m$ leading from the smoke-stack at a point back of the smoke-damper, to, and constituting the supply-passage of the blower and having the opening $n$ and an adjustable door or cover therefor, all substantially as described and for the purposes set forth.

LOUIS ST. PETER.

Witnesses:
  W. S. BELLOWS,
  M. A. CAMPBELL.